(No Model.)
R. A. LEIGH.
APPARATUS FOR SECURING ENDS OF BICYCLE TIRES.
No. 605,319. Patented June 7, 1898.
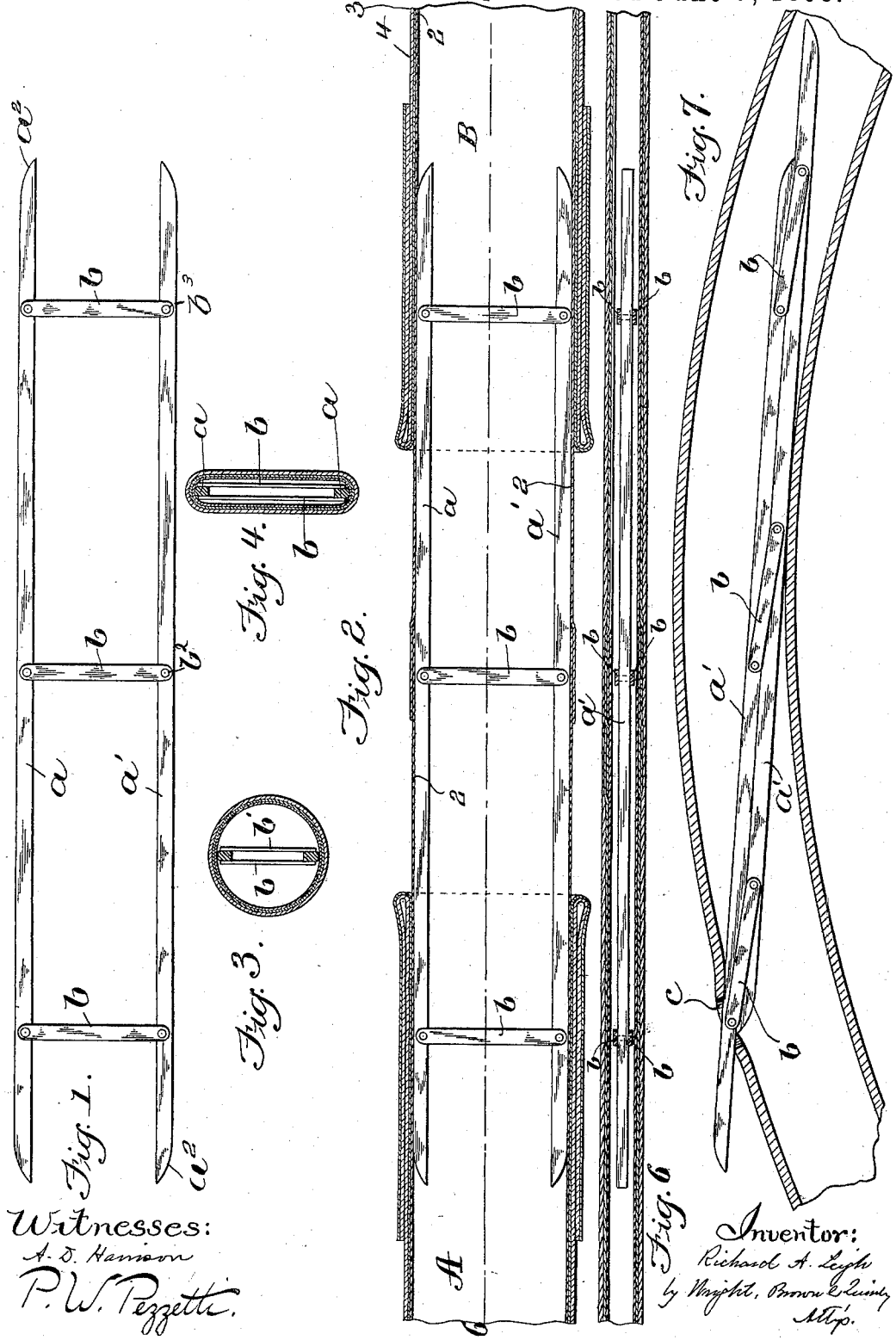

UNITED STATES PATENT OFFICE.

RICHARD A. LEIGH, OF BOSTON, MASSACHUSETTS, ASSIGNOR, BY MESNE ASSIGNMENTS, TO THE CONSOLIDATED RUBBER WORKS, OF SAME PLACE.

APPARATUS FOR SECURING ENDS OF BICYCLE-TIRES.

SPECIFICATION forming part of Letters Patent No. 605,319, dated June 7, 1898.

Application filed October 4, 1897. Serial No. 653,931. (No model.)

*To all whom it may concern:*

Be it known that I, RICHARD A. LEIGH, of Boston, in the county of Suffolk and State of Massachusetts, have invented certain new and useful Improvements in Appliances for Use in Securing the Ends of Bicycle-Tires, of which the following is a specification.

This invention has for its object to provide a simple device for receiving and supporting the ends of a bicycle-tire during the operation of splicing said ends together to form an endless tube.

In the construction of a hose-pipe tire formed of two or more layers of material it has heretofore been the practice to cement together the ends of the inner layer and then inflate the tube thus formed for the purpose of cementing on the superimposed layers; but by experience I have found that it is difficult to make a neat and regular joint when uniting the ends of a tire in this fashion for the reason that the air permits the inner tube or layer to yield under pressure and that hence the joint is apt to be irregular and uneven and to present an unsightly appearance.

This invention consists, therefore, of a collapsible device adapted to receive and hold the meeting ends of the tire rigidly, whereby the outer layer or layers may be neatly folded over each other and connected together in an expeditious and efficient manner, the device being subsequently removed through the valve-aperture in the tire, all as I shall now proceed to describe in detail and then point out in the claim.

Reference is to be had to the accompanying drawings, and to the letters and figures marked thereon, forming a part of this specification, the same letters or figures designating the same parts or features, as the case may be, wherever they occur.

Of the drawings, Figure 1 shows in side elevation one embodiment of my invention. Fig. 2 illustrates the manner of using the same. Fig. 3 represents a cross-section through one end of a tire, said device being partially extended. Fig. 4 represents a section through the end of a tire when the device is in its operative position. Fig. 6 represents a section on line 6 6 of Fig. 2. Fig. 7 illustrates the manner of removing a device from the tire after the ends of the same have been united.

Referring to the drawings, it will be seen that I have illustrated thereon only one form of my invention; but it will be understood that I am not limited to that form, as the invention is capable of being embodied in many other ways.

$a\ a$ represent two parallel steel rods or bars, which are to all intents and purposes unyielding and which have their ends rounded or beveled, as shown at $a^2\ a^2$. These rods or bars are connected together by connecting rods or links $b\ b'$, arranged in pairs and pivoted at their ends to the said bars or rods, as at $b^2\ b^3$. Thus it will be seen that the said bars or rods may be swung toward and from each other and always remain in parallelism, as will be readily understood.

The manner of employing the device thus formed is as follows: The two meeting ends A B of a hose-pipe tire having the inner layer 2 of rubber, a central layer 3 of fabric or interwoven threads, and an outer layer 4 of rubber or other suitable material are brought together, and the device is inserted in each end while it is in a collapsible condition. Then the parallel bars $a\ a'$ are separated until the links $b\ b'$ are at a right angle thereto and the said tire is flattened at its ends, as shown in Fig. 4. Then the ends of the inner layer 2 2 are brought together and overlapped, as shown in Fig. 2, and are cemented or otherwise secured together. Next the intermediate or central layer 3 of interwoven thread or fabric are drawn toward each other and overlapped and are otherwise secured together and coated with a suitable cement. Then the ends of the last layer are brought together until they meet, as shown in Fig. 6, and are cemented in place. After this has been done and the ends have been firmly united the holder is collapsed until the parallel bars $a\ a'$ lie side by side, and then it is worked around through the tire and removed through the valve-aperture C, as shown in Fig. 7.

From the foregoing description it will be seen that the invention is very simple and is highly efficient in operation.

Having thus explained the nature of the invention and described a way of constructing and using the same, although without attempting to set forth all of the forms in which it may be made or all of the modes of its use, I declare that what I claim is—

As a means for holding the separated ends of a tire in the process of construction, a collapsible holder comprising parallel bars and pivoted links connecting the said bars.

In testimony whereof I have signed my name to this specification, in the presence of two subscribing witnesses, this 14th day of July, A. D. 1897.

RICHARD A. LEIGH.

Witnesses:
A. D. HARRISON,
P. W. PEZZETTI.